Figure 1:
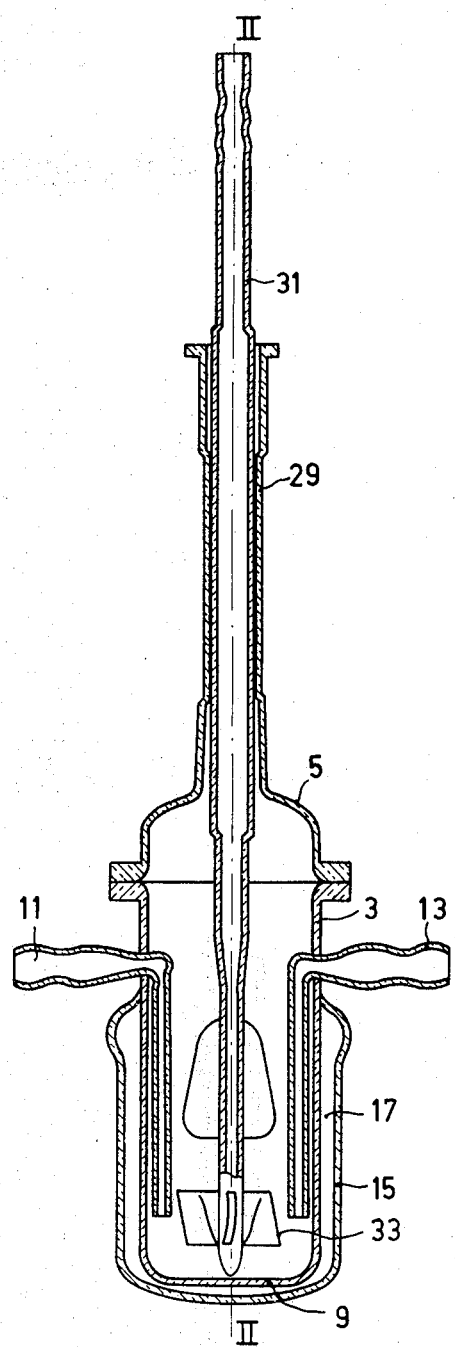

United States Patent [19]
Mühlpfordt

[11] 3,782,706
[45] Jan. 1, 1974

[54] REACTOR FOR PREPARING METAL POWDERS

[75] Inventor: Werner Mühlpfordt, Ludwigshafen, Germany

[73] Assignee: U.S. Philips Corporation, New York, N.Y.

[22] Filed: Mar. 24, 1972

[21] Appl. No.: 237,756

[30] Foreign Application Priority Data
Apr. 1, 1971   Germany................ P 21 15 928.4

[52] U.S. Cl................................. 266/22, 75/109
[51] Int. Cl................................... C22b 5/00
[58] Field of Search........... 266/12, 22; 75/104, 75/107–109; 23/285

[56] References Cited
UNITED STATES PATENTS

| | | | |
|---|---|---|---|
| 3,524,725 | 8/1970 | Cremer et al. | 23/285 |
| 2,474,592 | 6/1949 | Palmer | 23/288 E |
| 3,631,012 | 12/1971 | Zapf et al. | 23/285 |
| 3,055,929 | 9/1962 | Bozzetto | 23/285 |
| 3,257,171 | 6/1966 | Muench et al. | 23/285 |
| 3,600,156 | 8/1971 | Clapton et al. | 266/22 |
| 3,644,294 | 2/1972 | Siclari et al. | 23/285 |

*Primary Examiner*—Gerald A. Dost
*Attorney*—Frank R. Trifari

[57] ABSTRACT

A reactor for preparing metal powders by reduction of aqueous solutions with a sodium borohydride solution, which reactor comprises a reaction vessel closed by a cover and having two inlet members, a stirring device, an overflow and a cooling jacket. A gas outlet is connected to the cover on the side of the overflow said gas outlet enclosing an acute angle with the shaft of the stirring device. In the operating position of the reactor, the center line of the gas outlet extends vertically so that the hydrogen formed during the reaction and the poisonous diborane formed in a subreaction are removed without hindrance. Due to the inclined position of the stirring device, the precipitated metal powder and the mother liquor are swung into the overflow.

3 Claims, 2 Drawing Figures

REACTOR FOR PREPARING METAL POWDERS

The invention relates to a reactor for preparing metal powders by reduction of aqueous solutions with a sodium borohydride solution.

Methods of preparing metal powders in the manner described in the preamble, for example, by mixing a 1.5 m $NaBH_4$ solution with a 1 m $FeSO_4$ solution, are already known. In these known methods, the batch size, however, is very restricted because in large batch sizes with a yield, for example, of more than 30 g, the reaction heat can be poorly dissipated and the long duration of the experiment, the performance of the reaction, and the filtering and washing result in a prolonged contact of the precipitated metal powder with the agressive aqueous solution. Moreover, the filtering and washing in the case of large batch sizes is difficult to perform; the very poisonous diborane formed in a subreaction can be conducted away only incompletely.

It is the object of the present invention to provide a reactor for preparing metal powders by reduction of aqueous solutions with a sodium borohydride solution, which reactor permits preparing metal powders in a continuous operation and on a technical basis and in which the formed diborane is conducted away completely and with certainty.

According to the invention, this object is achieved by a reaction vessel which is closed at one end by a bottom part and at the other end by a cover and which comprises two inlet members, a stirring device, an overflow, a gas outlet and a cooling jacket which surrounds the reaction vessel at least partly.

The characterized reactor permits a continuous reaction with an uninterrupted supply of the solutions and conducting away of the metal powder and the diborane, the occurring reaction heat being conducted away by a cooling agent circulating in the cooling jacket.

In a further embodiment of the reactor according to the invention, the inlet members extend in the direction of the bottom part and the stirring device comprises a rotatable stirrer which is provided in the proximity of the bottom part and has a driving shaft extending in the longitudinal direction of the reaction vessel, the overflow being connected to the reaction vessel between the bottom part and the cover. By these measures a rapid reaction of the solutions is achieved and the time of contact of the precipitated metal powder with the agressive aqueous solution is restricted to the duration which is necessary for the reaction.

According to a further embodiment of the invention, the reactor comprises at least one injection nozzle which is directed to the stirring device. By injecting water through the injection nozzle during the reaction, the stirring device and the walls of the reaction vessel are cleaned from the metal powder which during the reaction is forced upwards by the strong hydrogen evolution with the formation of foam.

In a further embodiment of the reactor according to the invention, the gas outlet is connected to the cover, the center line of the driving shaft enclosing an acute angle with the center line of the gas outlet, the gas outlet and the overflow being provided on the same side with respect to the driving shaft. In the case of an inclined operating position of the reactor, in which the center line of the gas outlet extends in the vertical direction, on the one hand an optimum removal of the hydrogen and the diborane is ensured and on the other hand, due to the inclined position of the stirring device, the mixture of mother licquor and metal powder during stirring is centrifuged in the overflow so that this is constantly maintained free.

Experiments have proved that good results are obtained with an angle of 30° between the driving shaft and the gas outlet.

Figure 2:
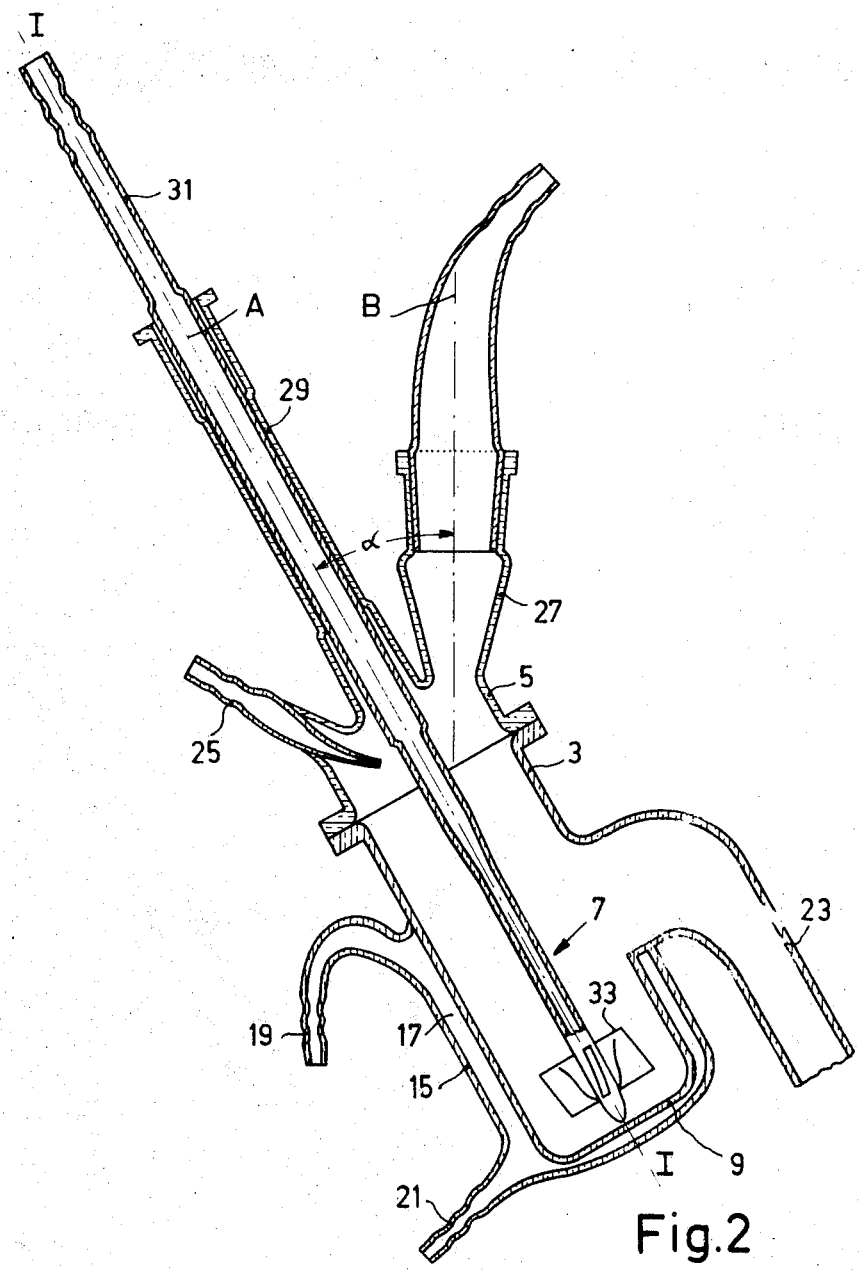

The invention will now be described with reference to the accompanying drawing, in which FIG. 1 is a longitudinal cross-sectional view of an embodiment of a reactor according to the invention taken on the line I—I of FIG. 2, FIG. 2 is a cross-sectional view taken on the line II—II of FIG. 1.

The reactor 1 according to the invention consists of a reaction vessel 3, a cover 5 and a stirring device 7. The reaction vessel 3 comprises a bottom part 9 on its lower side and inlet members 11, 13 for the supply of the reaction solutions, said members extending in the direction of the bottom part 9. An envelope 15 which partly surrounds the reaction vessel 3, constitutes with the wall of the reaction vessel a cooling jacket 17 which can be connected to an inlet pipe and an outlet pipe for cooling water via the connections 19, 21. Furthermore, an overflow 23 is connected to the reaction vessel 3 between the bottom part 9 and the cover 5. The cover 5 has an injection nozzle 25, a gas outlet 27 and a tubular pipe 29 which serves for journalling the driving shaft of the stirring device 7, to which shaft a stirrer 33 is connected. The center line A of the driving shaft 31 encloses an acute angle $\alpha$ with the center line B of the gas outlet 27, said angle being 30° in the present example.

FIG. 2 shows the operating position of the reactor in which the center line B of the gas outlet 27 extends in the vertical direction. When the reactor is put into operation, the connections 19 and 21 of the cooling jacket 17 are connected to a water inlet annd outlet, respectively. The stirrer 33 is rotated and the two reaction solutions to be mixed are forced, by means of metering pumps not shown, through the inlet members 11 and 13 into water which was previously provided, mixed by the action of the stirrer 33 and caused to react. The occurring reaction heat is dissipated by the cooling water circulating in the cooling jacket 17. For clarity, FIG. 2 shows the connections 19 and 21 on the same side of the reaction vessel 3. It is more efficient to provide said connections on oppositely located sides. The precipitated metal powder flows away together with the mother liquor via the overflow 23. As a result of the position of the stirring device 7 which is inclined in the operating position of the reactor, the mixture is constantly swung into the overflow 23 by the stirrer 33, as a result of which clogging thereof is prevented. Excellent results were obtained with an inclination of the stirring device of 30° relative to the vertical. The mixture conducted away through the overflow 23 is provided on a suitable, contiuously operating filtering and washing device (not shown). During the reaction, water is injected on the stirring device 7 by the injection nozzle 25. As a result of this, the metal powder which is forced upwards during the reaction by the strong hydrogen evolution with the formation of foam, is rinsed away from the stirring device and also from the walls of the reaction vessel. In addition, too strong a rise of the foam in the reaction vessel is prevented by the injected water. As a result of the vertical position of the gas outlet 27 in the operating position of the reactor, both the formed hydrogen and the diborane are completely and readily conducted away.

With a practical embodiment of the reactor according to the invention which had twice the dimensions of the device shown in the drawing, a yield of approximately 200 g of iron powder per hour was obtained by reduction of an $FeSO_4$ solution with an $NaBH_4$ solution.

Further metal powders can thus be prepared in the same manner starting from other solutions; alloyed metal powders may also be prepared by using mixed solutions which contain nickel sulphate and/or cobalt sulphate in addition to iron sulphate.

Of course, higher yields can be achieved with reactors having larger dimensions.

What is claimed is:

1. A reactor for preparing metal powders by reduction of aqueous solutions with a soldium borohydride solution, comprising a reaction vessel which is closed at one end by a bottom part (9) and at the other end by a cover (5) having two inlet members (11, 13) extending in the direction of the bottom part, a stirring device (7) comprising a rotatable stirrer (33) provided in proximity to the bottom part, said rotatable stirrer having a driving shaft (31) extending in the longitudinal direction of the reaction vessel, an overflow (23) connected to the reaction vessel (3) between the bottom part (9) and the cover (5), a gas outlet (27) connected to the cover (5), and a cooling jacket (17) which surrounds the reaction vessel (3) at least partly, the center line (A) of the driving shaft (31) enclosing an acute angle ($\alpha$) with the center line (B) of the gas outlet (27), the gas outlet (27) and the overflow (23) being provided on the same side with respect to the driving shaft.

2. A reactor as claimed in claim 1 including at least one injection nozzle (25) directed to the stirring device (7).

3. A reactor as claimed in claim 1 wherein the angle ($\alpha$) is 30°.

* * * * *